United States Patent
Zaitsu

[11] Patent Number: 5,739,622
[45] Date of Patent: Apr. 14, 1998

[54] CONVERTER WHEREIN A PIEZOELECTRIC TRANSFORMER INPUT SIGNAL IS FREQUENCY MODULATED BY A PULSE WIDTH MODULATED SIGNAL

[75] Inventor: Toshiyuki Zaitsu, Tokyo, Japan

[73] Assignee: NEC Corporation, Tokyo, Japan

[21] Appl. No.: 692,279

[22] Filed: Aug. 5, 1996

[30] Foreign Application Priority Data

Aug. 7, 1995 [JP] Japan ................................ 7-201213
Aug. 8, 1995 [JP] Japan ................................ 7-202451

[51] Int. Cl.$^6$ ................................................ H01L 41/08
[52] U.S. Cl. .................................... 310/316; 310/317
[58] Field of Search ............................ 310/317, 316, 310/319, 366, 358, 359; 363/97, 133

[56] References Cited

U.S. PATENT DOCUMENTS

| | | | |
|---|---|---|---|
| 3,657,579 | 4/1972 | Kramer | 310/316 X |
| 4,054,936 | 10/1977 | Ansai et al. | 361/260 |
| 5,118,982 | 6/1992 | Inoue et al. | 310/366 |
| 5,329,200 | 7/1994 | Zaitsu | 310/316 |
| 5,341,061 | 8/1994 | Zaitsu | 310/318 |
| 5,389,852 | 2/1995 | Toda | 310/366 |
| 5,394,048 | 2/1995 | Yamashita et al. | 310/316 |
| 5,548,189 | 8/1996 | Williams | 315/224 |

FOREIGN PATENT DOCUMENTS

| | | |
|---|---|---|
| 4-210773 | 7/1992 | Japan. |
| 6-167694 | 6/1994 | Japan. |

*Primary Examiner*—Mark O. Budd
*Attorney, Agent, or Firm*—Sughrue, Mion, Zinn, Macpeak & Seas, PLLC

[57] ABSTRACT

In a converter or inverter comprising a switching circuit (23) for switching a direct current input signal into an alternating current switched signal, a piezoelectric transformer (25) for driving a load (27) with a converter output signal, and an FM modulator (43-47) for detecting the converter output signal to produce a rectangular signal for adjusting a switched frequency of the switched signal, a duty ratio adjuster (49) is supplied with the direct current input signal to control the rectangular signal for adjustment of a duty ratio of the switched signal. Preferably, a filter (29) filters the switched signal for the piezoelectric transformer. The converter is given a high efficiency by use of a rectifier on producing the converter output signal. Furthermore, the switching circuit may comprise first (31) and second (33) switching elements, which may be used as an active clamp circuit to linearize a feed forward characteristic of the duty ratio.

40 Claims, 12 Drawing Sheets

CONVERTER WHEREIN A PIEZOELECTRIC TRANSFORMER INPUT SIGNAL IS FREQUENCY MODULATED BY A PULSE WIDTH MODULATED SIGNAL

BACKGROUND OF THE INVENTION

This invention relates to a converter or inverter comprising a piezoelectric transformer.

Such a converter is used in various fields. More particularly, an inverter is used in a.c. driving a load. A converter is more specifically called a DC-DC converter and is used in d.c. driving a load.

The inverter is widely used in personal computers in driving a light source for generating back light for a liquid crystal display. The back light is generated in general by using a cold cathode tube as the load. The cold cathode tube has a high load resistance, such as several hundreds of kiloohms before switched on and a low resistance after turned on. An inverter input signal has a d.c. inverter input voltage variable between 5 volts and 20 volts. An inverter output signal must have an a.c. inverter output voltage of at least 1 kV.

Speaking generally, the inverter and the DC-DC converter are similar in structure and operation. The word "converter" will therefore be used herein in common to the inverter and the DC-DC converter. The converter is supplied with a d.c. signal as a converter input signal and produces a converter output signal for use in driving a load.

In general, the converter comprises a transformer and a switching circuit for switching the converter input signal into a quasi-sinusoidal waveform. An electro-magnetic transformer is rendered compact when the transformer input signal has a high frequency. The electromagnetic transformer becomes, however, objection-able due to a hysteresis loss, an eddy current loss, and a skin effect loss when the transformer input signal is in a megahertz band.

A piezoelectric or ceramic transformer has therefore been preferably used in place of the electro-magnetic transformer. The piezoelectric transformer, however, has a sharp resonant frequency. As a result, match is necessary between the resonant frequency and a switched frequency given by the switching circuit to the transformer input signal. In a conventional converter, such as disclosed in Japanese Patent Prepublication (A) No. 167,694 of 1994, the switched frequency is swept on turning the cold cathode tube on from a high frequency higher than the resonant frequency down towards a low frequency lower than the resonant frequency. The converter output signal is thereby kept at a predetermined voltage or current.

Prior to this, an excellent laminated piezoelectric transformer is revealed in U.S. Pat. No. 5,118,982 by Takeshi Inoue and two others, assignors to the present assignee, as a thickness mode vibration piezoelectric transformer. This excellent piezoelectric transformer is preferably used in a high efficiency converter revealed in a prior patent application which was filed on the 26th Feb. 1996 by the instant applicant and identified as U.S. patent application Ser. No. 605,491 (European Patent Application No. 96 102 826.3). The high efficiency converter has a high converter efficiency regardless of a wide variation in the load resistance.

Both in the conventional converter and the high efficiency converter, the converter output voltage (or current) is kept constant merely by frequency modulating the converter input signal. As a consequence, the converter output voltage is subjected to an undesirable variation when the converter input voltage varies in a wide range.

In Japanese Patent Prepublication (A) No. 210,773 of 1992, a prior converter comprises the piezoelectric transformer and the switching circuit. The switching circuit produces the transformer input signal with an adjustable duty ratio in addition to the switched frequency. In the prior converter, a detecting circuit detects the converter output signal to produce a detected voltage. A voltage-to-frequency converter, such as a voltage controlled oscillator, converts the detected voltage to a detected frequency signal of a detected frequency. Furthermore, a voltage-to-duty ratio converter converts the detected voltage to a duty ratio adjusting signal. Both the detected frequency signal and the duty ratio adjusting signal are fed back to the switching circuit to adjust the switched frequency and the duty ratio.

In this manner, the prior converter is operable with the transformer input signal controlled by a feedback control into which both frequency modulation (FM) and pulse width modulation (PWM) are combined. This makes it possible to keep the converter output voltage (or current) constant against variations in the load resistance and the converter input voltage. This has, however, been impractical because of various problems which should be solved. For example, it is not clear which of the frequency modulation and the pulse width modulation should be given a priority right and in what manner it is possible to get rid of interference of the frequency modulation and the pulse width modulation on each other.

In the high efficiency converter, the switching circuit switches the converter input signal into a switched signal. A filter circuit filters the switched signal into the transformer input signal. The switching circuit and the filter circuit are cooperatively operable as input circuitry. A rectifier circuit, which may be either of a half-bridge or a full-bridge rectifier, rectifies the transformer input signal into the converter output signal. The rectifier serves as output circuitry and obviates a circulation loss which will later be described.

SUMMARY OF THE INVENTION

It is consequently a principal object of the present invention to provide a converter which is for converting a d.c. converter input signal to a converter output signal for use in driving a load and which is capable of keeping the converter output signal constant regardless of variations in a load resistance and in a converter input voltage of the converter input signal.

It is another principal object of this invention to provide a converter which is of the type described and which has a high converter efficiency.

It is a subordinate object of this invention to provide a converter which is of the type described and which is as compact as possible.

It is another subordinate object of this invention to provide a converter which comprises a piezoelectric transformer to be of the type described and which is useful when the piezoelectric transformer has a small input capacitance.

It is still another subordinate object of this invention to provide a converter which comprises a piezoelectric transformer to be of the type described in the principal objects and is useful when the piezoelectric transformer has not a sufficiently small input capacitance.

It is yet another subordinate object of this invention to provide a converter which is of the type described and which is useful when the piezoelectric transformer has not a sufficient voltage amplification factor.

It is a further subordinate object of this invention to provide a converter which is of the type described and which is capable of insuring operation.

It is a still further object of this invention to provide a converter which is of the type described and which can conveniently pulse width modulate a transformer input signal.

It is a yet further object of this invention to provide a converter which is of the type described and which is capable of obviating a circulation loss of the piezoelectric transformer.

Other objects of this invention will become clear as the description proceeds.

In accordance with this invention, there is provided a converter for converting a d.c. converter input signal to a converter output signal for use in d.c. driving a load, comprising: (A) input means responsive to the converter input signal for producing a transformer input signal of a switched frequency and an adjustable duty ratio, (B) piezoelectric transformer means for transforming the transformer input signal into a transformer output signal, (C) output means responsive to the transformer output signal for producing the converter output signal, (D) detecting means for detecting the converter output signal to produce a detected voltage, (E) voltage-to-frequency converting means for converting the detected voltage to a detected frequency, (F) driving means responsive to the detected frequency for driving the input means by a substantially rectangular drive signal to adjust the switched frequency, and (G) duty ratio adjusting means responsive to the converter input signal for controlling the substantially rectangular signal to adjust the duty ratio.

DESCRIPTION OF THE PREFERRED EMBODIMENT

Figure 1:
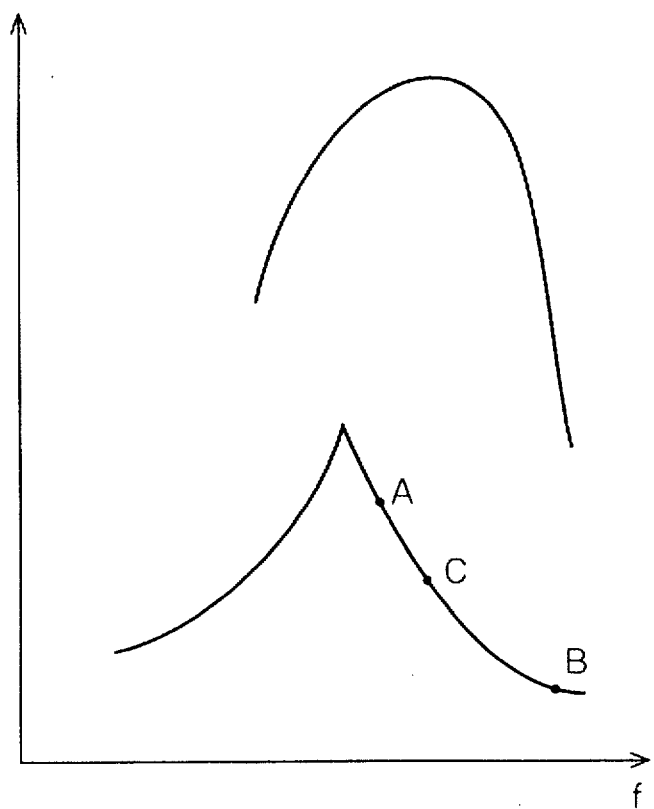
FIG. 1 schematically shows frequency characteristics of a piezoelectric transformer.

Referring to FIG. 1, a lower curve has a cusp and represents a band-pass filter characteristic of a piezoelectric or ceramic transformer in general with frequency f scaled along the abscissa. The piezoelectric transformer is supplied with a transformer input power of a transformer input frequency to produce a transformer output signal of a transformer output power. A transformer efficiency of the piezoelectric transformer is defined by the transformer input and output powers and is exemplified by an upper curve to have a maximum at a frequency which is a little higher in the example being illustrated than a resonant frequency of the piezoeletric transformer or of the band-pass filter characteristic.

Figure 2:
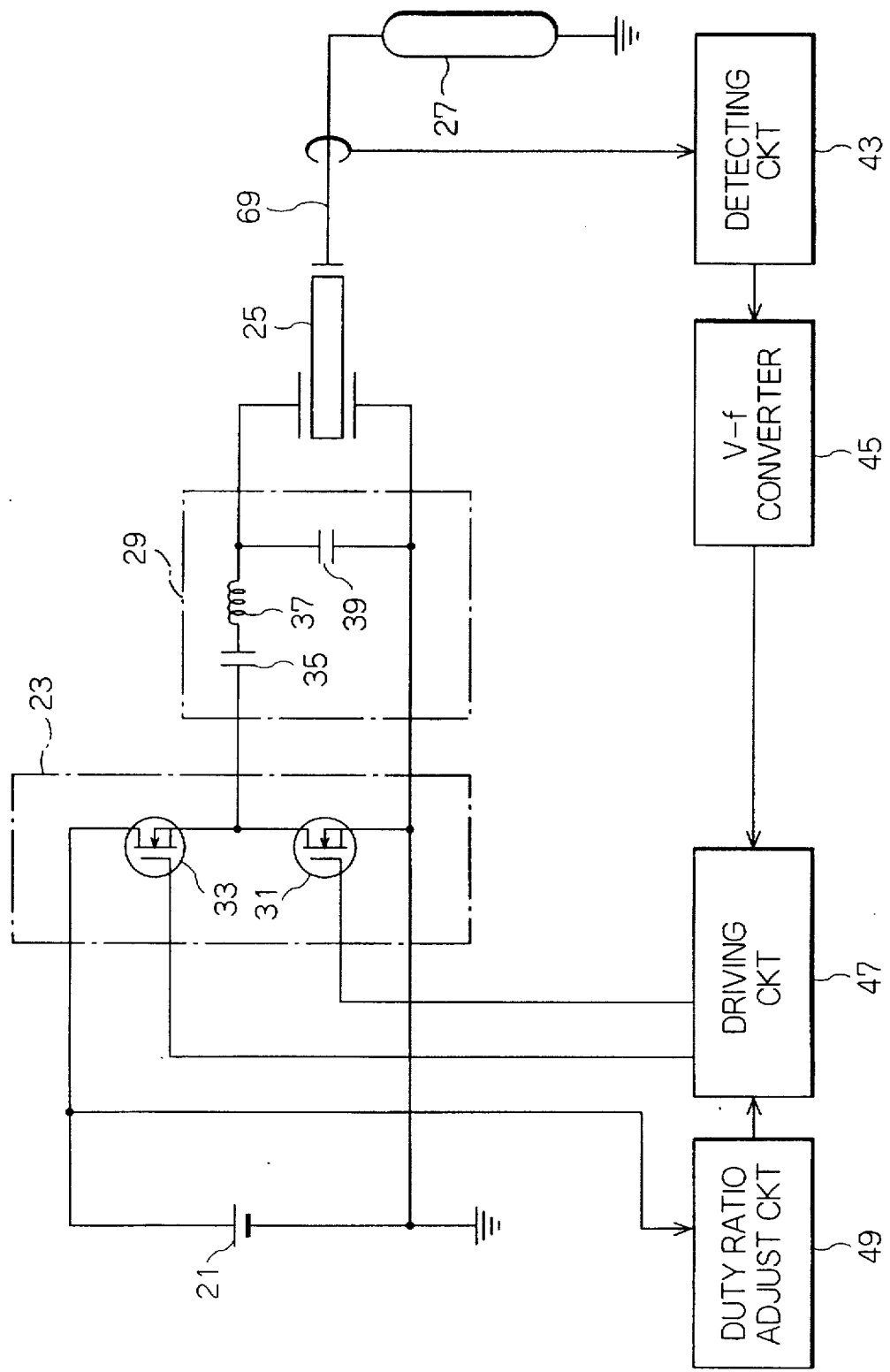
FIG. 2 is a block diagram of a converter according to a first embodiment of the instant invention.

Referring to FIG. 2, a converter is depicted according to a first preferred embodiment of the present invention and is supplied from an input power source 21 with a converter input signal of a d.c. converter input voltage V(in). In general, such a converter comprises a switching circuit 23 for switching the converter input signal into a switched signal in response to a substantially rectangular drive signal which will presently be described and defines a switched frequency of the switched signal with an adjustable duty ratio D. As will later become clear, the switched signal is used as the transformer input signal with the switched frequency used as the transformer input frequency. Responsive to the transformer input signal, a piezoeletric transformer 25 produces the transformer output signal for use as a converter output signal of a converter output voltage V(out). The converter output signal is delivered with a converter output current to a cold cathode tube used as a load 27.

Referring again to FIG. 1 and continuously to FIG. 2, the piezoelectric transformer 25 has the band-pass filter characteristic having the resonant frequency. On the other hand, the converter input voltage V(in) is variable in a wide input voltage range. For example, the converter input voltage may be 5 volts and 20 volts, namely, be variable with a voltage variation ratio of one to four. In the conventional converter, or more specifically inverter, described heretobefore, the converter output voltage V(out) or current is kept constant with the switched frequency shifted considerably from the resonant frequency. For example, it will be assumed that the switched frequency should be 114 kHz indicated by a point A when the converter input voltage is 5 volts high. In this event, the switched frequency should be 117 kHz depicted by another point B when the converter input voltage is 20 volts high. In the transformer efficiency, a deterioration of about 10% results when only a 3-kHz (about 3%) shift occurs in the switched frequency because the piezoelectric transformer 25 has a high Q. Variations in the converter input voltage must be kept in the conventional converter within a voltage variation ratio of one to two.

Figure 3:
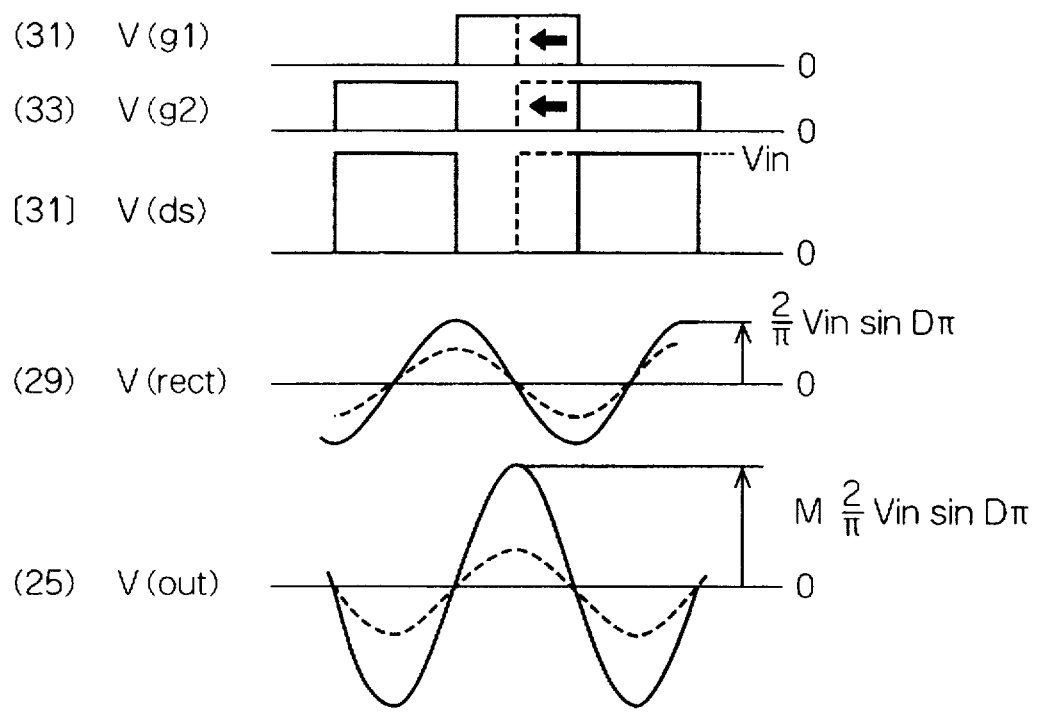
FIG. 3 schematically shows signal waveforms at several points in the converter illustrated in FIG. 2.

Referring to FIG. 3 and more specifically to FIG. 2, the converter comprises a filtering circuit 29 connected to the switching circuit 23 to filter the switched signal into a filtered signal for delivery to the piezoelectric transformer 25 as the transformer input signal. The switching circuit 23 comprises first and second MOS field effect transistors (FET's) connected as first and second switching elements 31 and 33 in series across the input power source 21 and controlled by first and second gate control signals V(g1) and V(g2) which are collectively used as the substantially rectangular drive signal and are depicted in FIG. 3 along first or top and second rows with labels (31) and (33) enclosed with parentheses. The first switching element 31 is grounded and develops a substantially rectangular output signal V(ds) which is used as the switched signal and is illustrated along a third row with a label [31] enclosed with brackets. In the example being illustrated, the switched signal has a peak voltage equal to the converter input voltage V(in). In FIG. 3, the first and-the second gate control signals, the switched signal, and others are drawn by solid and dashed lines for the duty ratio of 0.5 (a maximum) and 0.25, respectively.

The filtering circuit 29 comprises a d.c. bias blocking capacitor 35 connected to a point of series connection between the first and the second switching elements 31 and 33. A filtering circuit series inductor 37 is connected in series between the blocking capacitor 35 and one of a pair of input electrode layers of the piezoelectric transformer 25. A filtering circuit parallel capacitor 39 is connected parallel to the first switching element 31 and to the input electrode layers and is operable in cooperation with an input capacitance of the piezoelectric transformer 25. The filtered signal has a substantially sinusoidal voltage V(rect) as the transformer input voltage in the manner exemplified along a fourth row labelled (29). No problem results from distortion of the transformer input signal from a sine curve. The transformer output signal is depicted as the converter output signal V(out) along a fifth or bottom row with a label (25).

Figure 4:
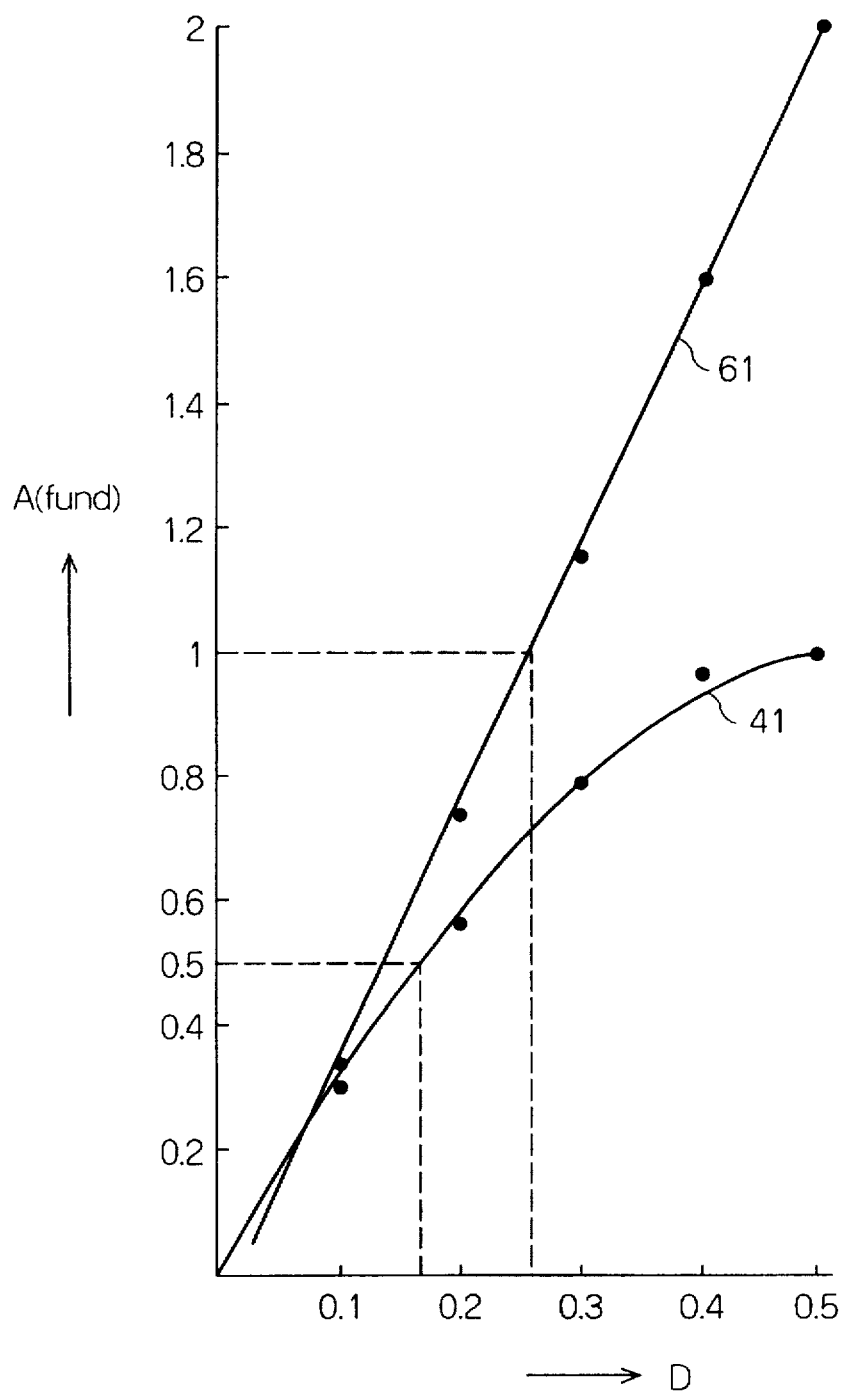
FIG. 4 shows mathematical loci for use in describing operation of the converter illustrated in FIG. 2.

Turning to FIG. 4 with FIGS. 2 and 3 continuously referred to, the Fourier expansion will be applied to the rectangular output voltage V(ds). The result is given by a sum of a d.c. component and an a.c. component of first or fundamental, second, third, and other terms as:

$$V(ds) = V(in)D + V(in)(2/\pi) \{-\sin D\pi \cos x + (1/2)\sin 2D\pi \cos 2x - (1/3)\sin 3D\pi \cos 3x \pm \ldots \}.$$

By the band-pass filter characteristic, the piezoelectric transformer 25 transmits among the a.c. component only the fundamental component, which has an amplitude A(fund) given by:

$$A(fund) = -V(in)(2/\pi)\sin D\pi$$

In FIG. 4, this amplitude A(fund) is depicted versus the duty ratio D by a curve 41. The amplitude is normalized by a normalization factor of $(2/\pi)V(in)$ to be equal to unity when the duty ratio D is equal to 0.5.

In FIG. 3, the substantially sinusoidal voltage V(rect) has a peak input amplitude of $(2/\pi)V(in)\sin D\pi$. The converter output voltage V(out) has an output amplitude of $M(2/\pi)V(in)\sin D\pi$, where M represents a voltage amplification factor of the piezoelectric transformer 25. It is possible to adjust the transformer input voltage and the converter output voltage by varying the duty ratio.

In FIG. 2, the converter comprises a converter output signal detecting circuit 43 for detecting the converter output signal or current to produce a detected voltage. A voltage-to-frequency (V-f) converting circuit 45 converts the detected voltage to a frequency, which is herein called a detected frequency. Responsive to the detected frequency, a driving circuit 47 delivers the first and the second gate control signals V(g1) and V(g2) to the first and the second switching elements 31 and 33 to control the switched frequency in synchronism with the detected frequency. In this manner, the converter output signal, namely, the converter output voltage V(out) or current, is subjected to the frequency modulation feedback control.

In contrast to the pulse width modulation used in the feedback control in the prior converter described heretobefore, the pulse width modulation is used in a feed forward manner in the converter of the present invention. More particularly, a pulse width modulating (PWM) circuit 49 is supplied with the converter input signal to deliver a duty ratio control signal to the driving circuit 47 to adjust the duty ratio of the substantially rectangular drive signal and thereby the switched signal. That is, the duty ratio control signal adjusts the duty ratio which is common to the first and the second gate control signals.

Reviewing FIGS. 1 through 4, the illustrated converter is capable of keeping the converter output voltage V(out) or current constant regardless of a variation of a range of one to four in the converter input voltage V(in). In order so to control the converter output signal by the pulse width modulation alone, the duty ratio must be changed from 0.5 (the maximum) down to 0.08. A small duty ratio, however, gives rise to an objectionable increase in a switching loss in the switching circuit 23 and results in a decrease in the converter efficiency. As a consequence, the pulse width modulation is primarily resorted to so as to adjust the duty ratio between 0.5 and either 0.20 or 0.25. A variation in the converter output voltage or current may remain when the converter input voltage varies in a wide range of one to four. This remaining variation is suppressed by the frequency modulation. It is thereby possible with this invention to restrict in FIG. 1 the switching frequency, namely, the transformer input frequency, between the point A and another point C and to prevent the transformer efficiency and consequently the converter efficiency from deterioration.

Figure 5:
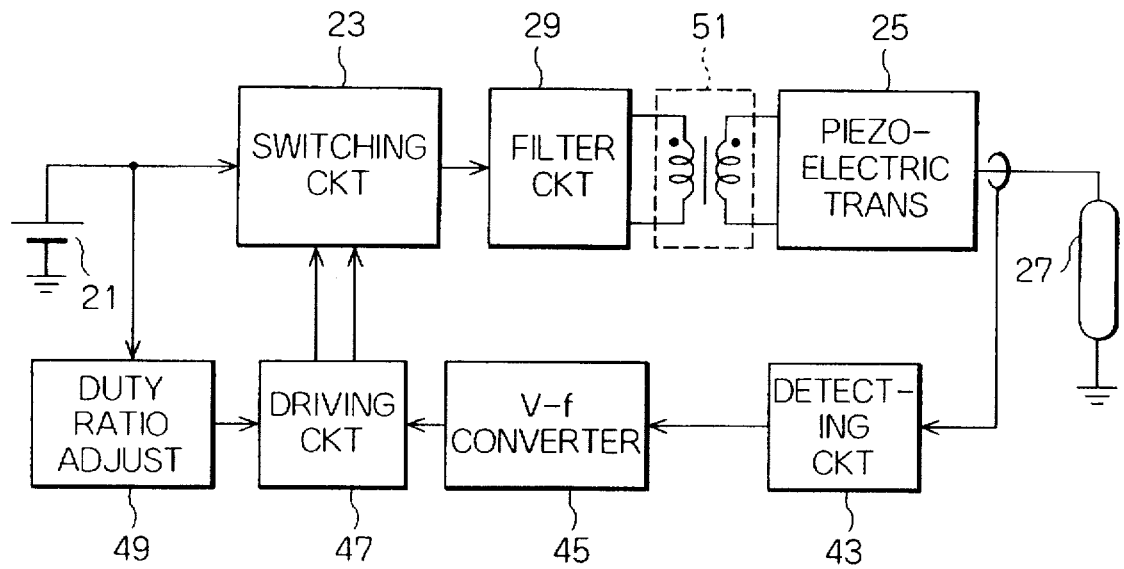
FIG. 5 is a block diagram of a modification of the converter depicted in FIG. 2.

FIG. 5 will now be referred to. Throughout the following, similar parts are designated by like reference numerals and are similarly operable with likewise named signals.

In FIG. 5, a modification of the converter of FIG. 2 comprises an electromagnetic transformer 51 between the filtering circuit 29 and the piezoelectric transformer 25. This converter is well operable even when the piezoelectric transformer 25 has a small voltage amplification factor.

Figure 6:
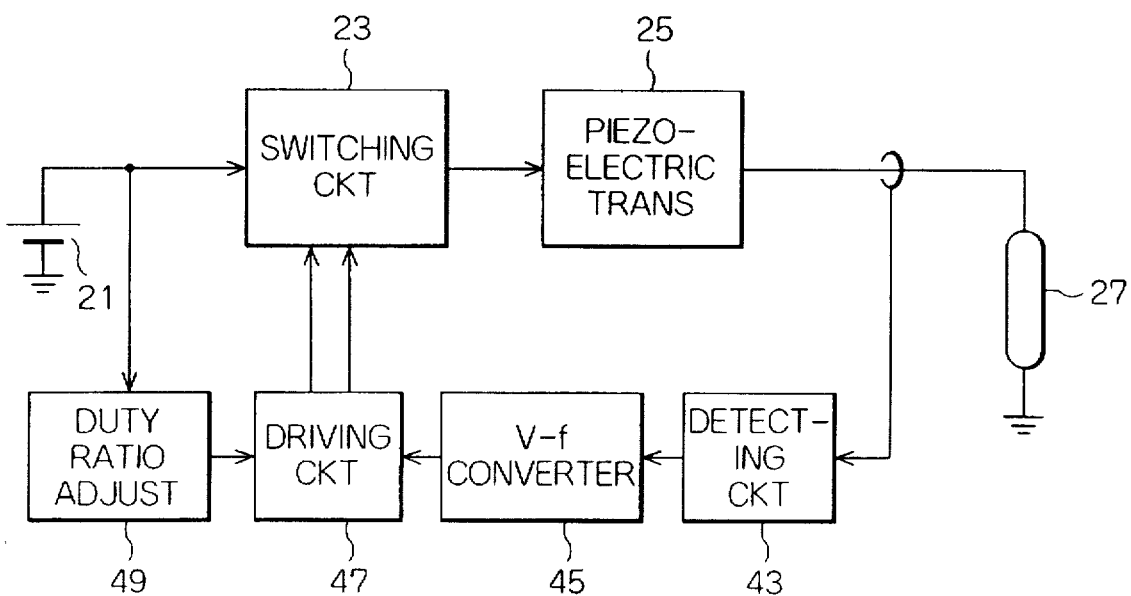
FIG. 6 is a block diagram of another modification of the converter depicted in FIG. 2.

Turning to FIG. 6, another modification of the converter does not comprise the filtering circuit 29 depicted in FIG. 2. This modification is more compact and is used when the transformer input capacitance is small, as for example, about 500 pF or smaller., and need not care for charge and discharge losses in the piezoelectric transformer 25.

Figure 7:
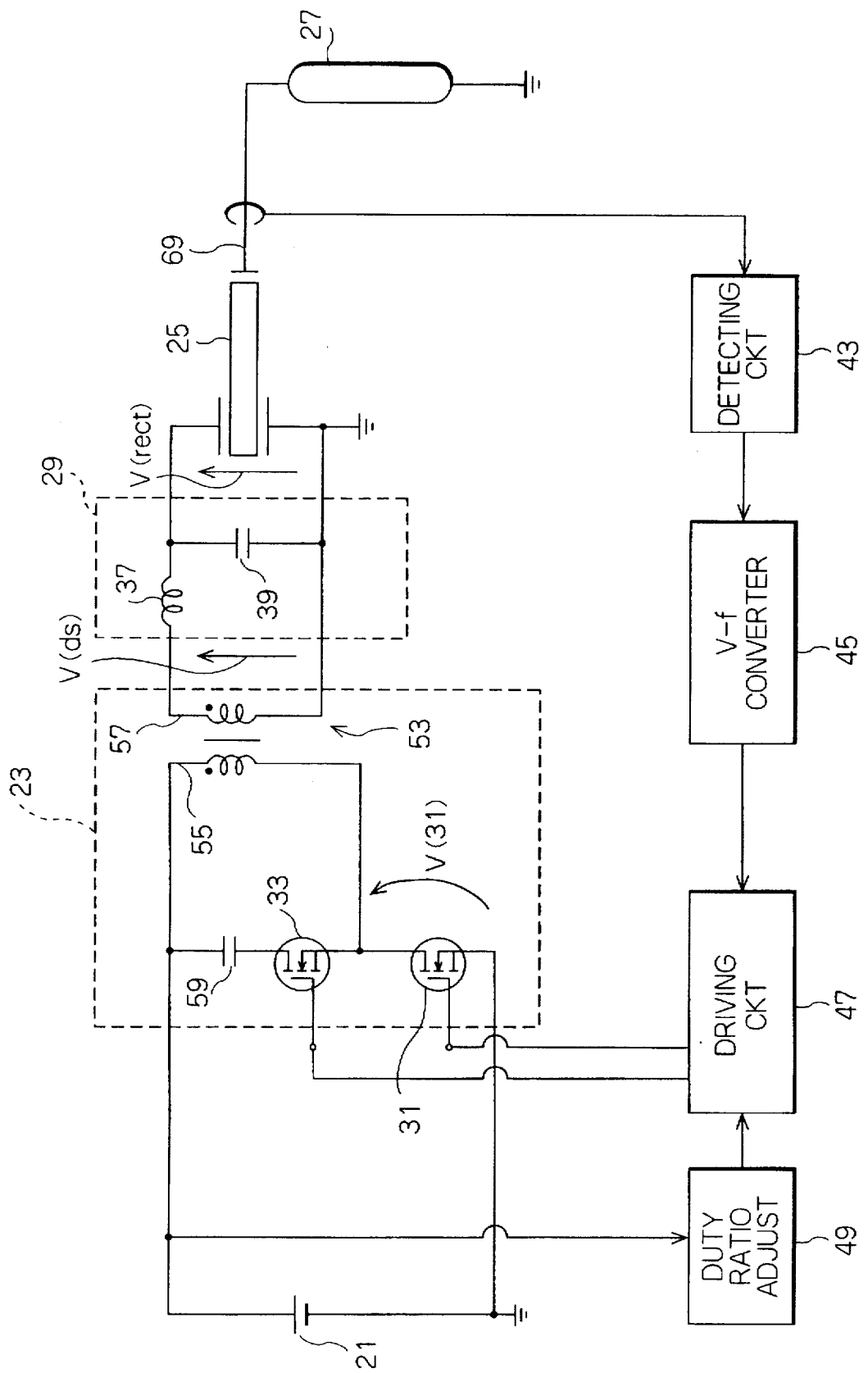
FIG. 7 is a block diagram of a converter according to a second embodiment of this invention.
Figure 8:
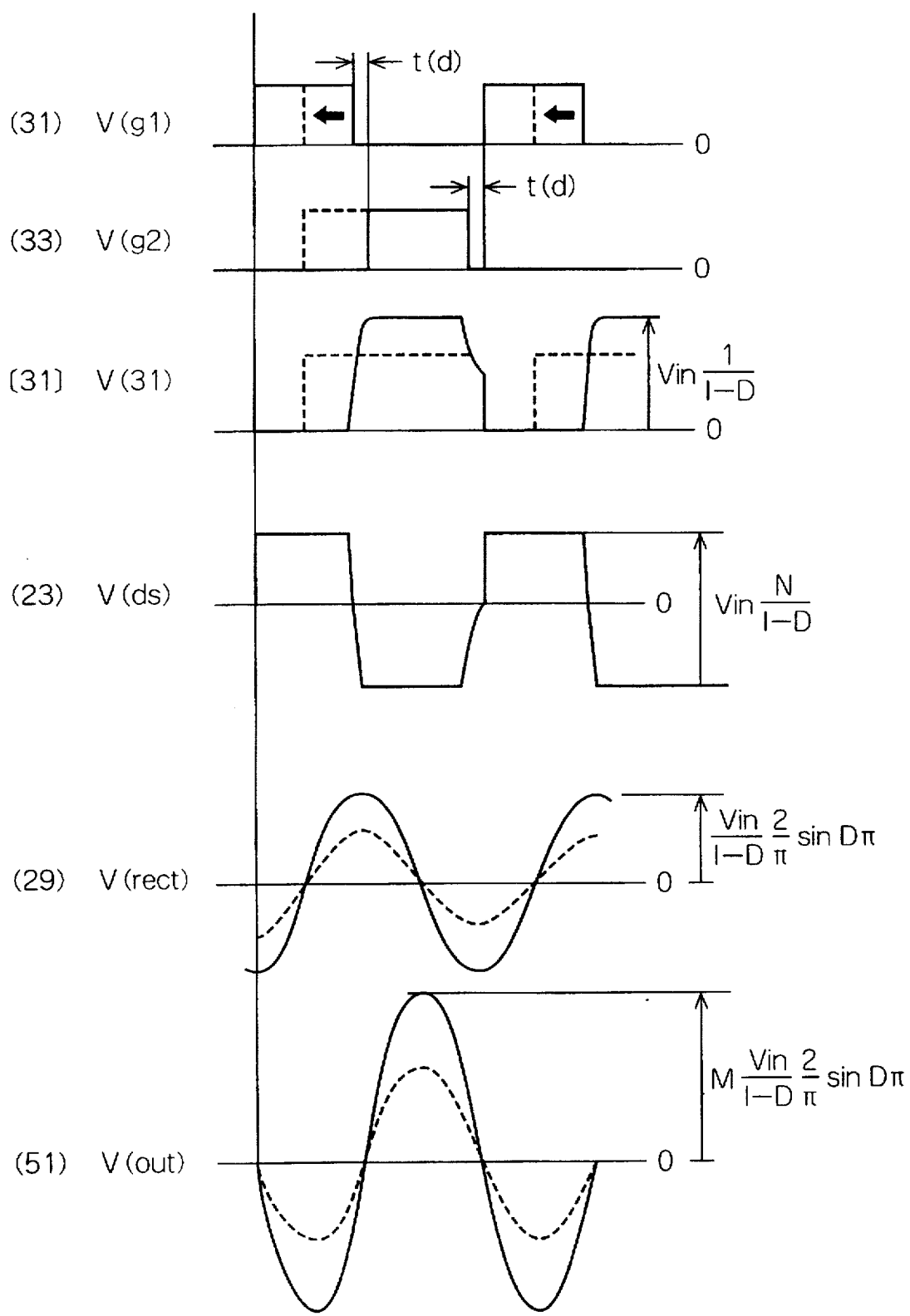
FIG. 8 schematically shows signal waveforms at several points in the converter illustrated in FIG. 7.

Referring to FIGS. 7 and 8, the description will proceed to a converter according to a second preferred embodiment of this invention. This converter is operable with the switched signal and consequently the converter output signal subjected to the pulse width modulation in accordance with active clamp in addition to zero volt switching. In other respects, the converter of FIGS. 7 and 8 is similar to that illustrated with reference to FIGS. 2 through 4 except for a little change in the filtering circuit 29.

More specifically, the switching circuit 23 comprises in FIG. 7 an electromagnetic transformer which is used in delivering the switched signal to the filtering circuit 29 to be different in this respect from the electromagnetic transformer 51 described in conjunction with FIG. 5 and is therefore designated by a new reference numeral 53. This electromagnetic transformer 53 has primary and secondary windings 55 and 57 of a turn ratio of 1: N. Grounded like in FIG. 1, the first switching element 31 is periodically kept on with the duty ratio D by the substantially rectangular drive signal to supply the converter input signal from the input power source 21 to the primary winding 55 and thereby to develop a primary winding voltage across the primary winding 55 while kept on. A clamping capacitor 59 is connected in series to the second switching element 33 which is switched alternatingly relative to the first switching element 31. The secondary winding 57 has one end grounded.

In the manner illustrated in FIG. 8 along first or top and second rows with labels (31) and (33), the first and the second gate control signals V(g1) and V(g2) are used to control the first and the second switching elements 31 and 33. Each pulse of the second gate control voltage is spaced by a dead time t(d) from an adjacent pulse of the first gate control signal. This enables an exciting current to flow through the primary winding 55 to charge and discharge parasitic capacitances of the first and the second switching elements 31 and 33 during such dead times. The zero volt switching is thereby achieved to reduce the switching loss. As drawn along a third row indicated by a label [31] with the brackets, an output rectangular pulse signal V(31) is developed across the first switching element 31 to have a peak value of V(in)/(1−D) while the second switching element 33 is kept on. This primary winding voltage develops the switched signal which is now indicated by V(ds) and is exemplified along a fourth row with a label (23) to have a peak-to-peak amplitude of NV(in)/(1−D).

Once more referring to FIG. 7, the filtering circuit 29 need not comprise the d.c. bias blocking capacitor 35 described in connection with FIG. 2 but comprises only the filtering circuit series inductor 37 and the filtering circuit parallel capacitor 39. As drawn in FIG. 8 along a fifth row with a label (29), the substantially sinusoidfunvoltage V(rect) has a fundamental component amplitude A(fund) given as:

$$A(fund)=\{V(in)/(1-D)\}\times(2/\pi)\sin D\pi,$$

to have a peak amplitude $\{V(in)/(1-D)\}\times(2/\pi)\sin D\pi$ when the active clamp is applied to the switching circuit 23. This amplitude is linear as regards the duty ratio in the manner drawn in FIG. 1 by a straight line 61 when normalized by the normalization factor of $(2/\pi)V(in)$. The active clamp therefore reduces a burden imposed on the duty ratio for the pulse width modulation to cope with the variation in the converter input voltage. The converter output voltage V(out) is as depicted in FIG. 8 along a sixth or bottom row labelled (51) to have a peak amplitude $M\{V(in)/(1-D)\}\times(2/\pi)\sin D\pi$.

In FIG. 7, the second switching element 33 is floating connected. This is because an n-channel MOS field effect transistor is used. When the second switching element 33 is a p-channel MOS field effect transistor, it is possible to use its source electrode at the electric potential of the source electrode of the first switching element 31. As a result, floating connection of the second switching element 33 is unnecessary.

Figure 9:
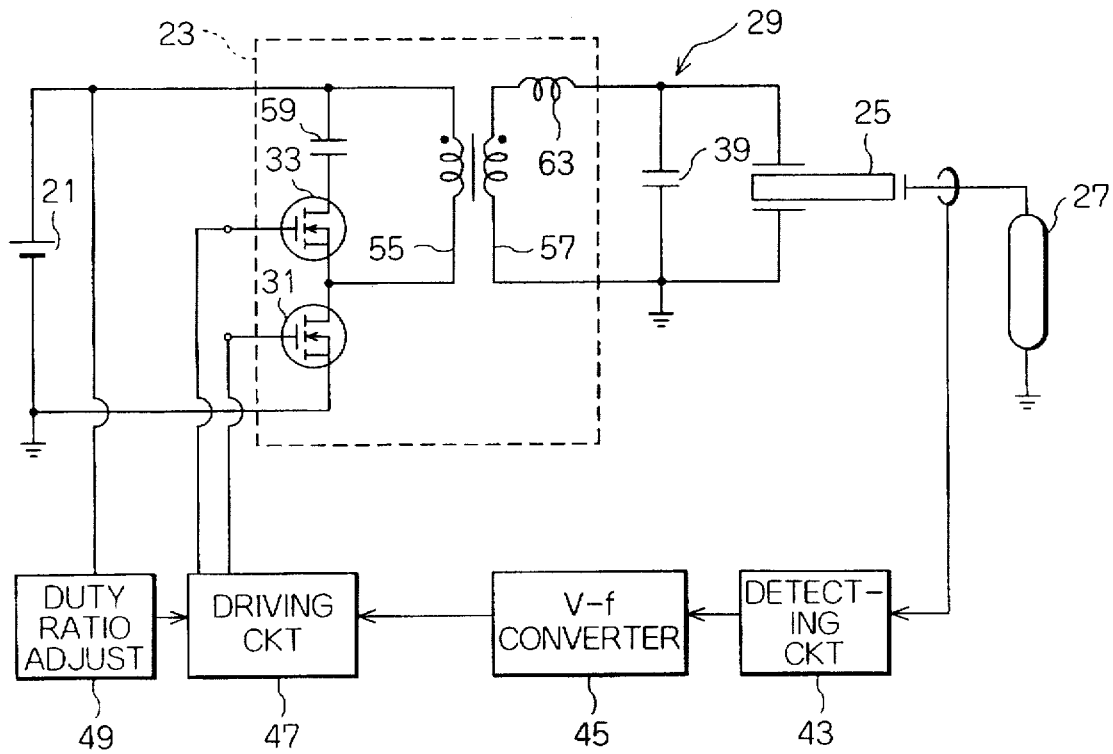
FIG. 9 is a block diagram of a modification of the converter depicted in FIG. 7.

Turning to FIG. 9, a converter is a modification of the converter illustrated with reference to FIGS. 7 and 8. In this converter, the electromagnetic transformer 53 comprises a leakage inductor 63 connected in series to the secondary winding 57. In the filtering circuit 29, the leakage inductor 63 is used in place of the filtering circuit series inductor 37 described in conjunction with FIG. 7.

Further turning to FIG. 10, attention will be directed to another modification of the converter described with reference to FIGS. 7 and 8. It is surmised in this converter that the piezoelectric transformer 25 has a sufficiently great voltage amplification factor. The turn ratio of 1:1 is consequently used for the electromagnetic transformer 53 of FIG. 7 with an active clamp inductor 65 used instead of this electromagnetic transformer. This advantageously miniaturizes the converter illustrated with reference to FIG. 7.

Figure 10:
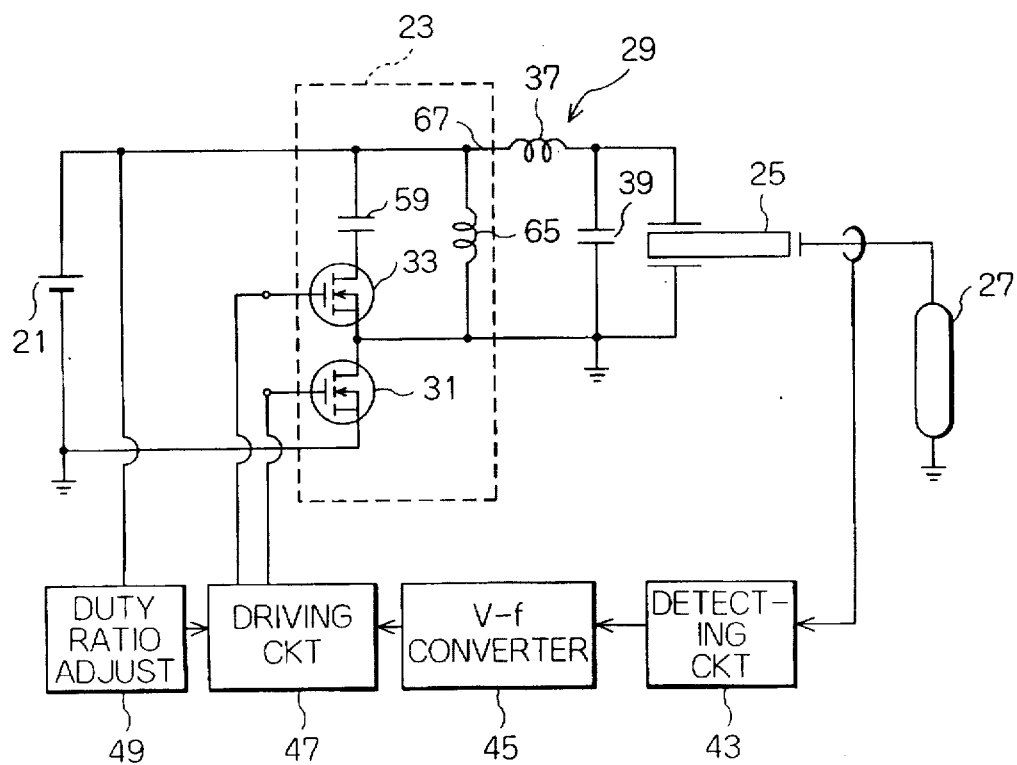
FIG. 10 is a block diagram of another modification of the converter depicted in FIG. 7.

In FIGS. 9 and 10, it is understood that the primary winding 55 is equivalent to the active clamp inductor 65 to develop a clamping circuit output voltage while the first switching element is off. The secondary winding 57 produces the clamping circuit output voltage as the switched signal. In FIG. 10, a mere connection 67 serves to produce the clamping circuit output voltage as the switched signal.

FIGS. 2, 5, and 7 will be reviewed. It should be noted in these preferred embodiments that the transformer output signal is used as the converter output signal as it stands. That is, a signal delivery connection 69 serves as output circuitry for producing the transformer output signal as the converter output signal.

Figure 11:
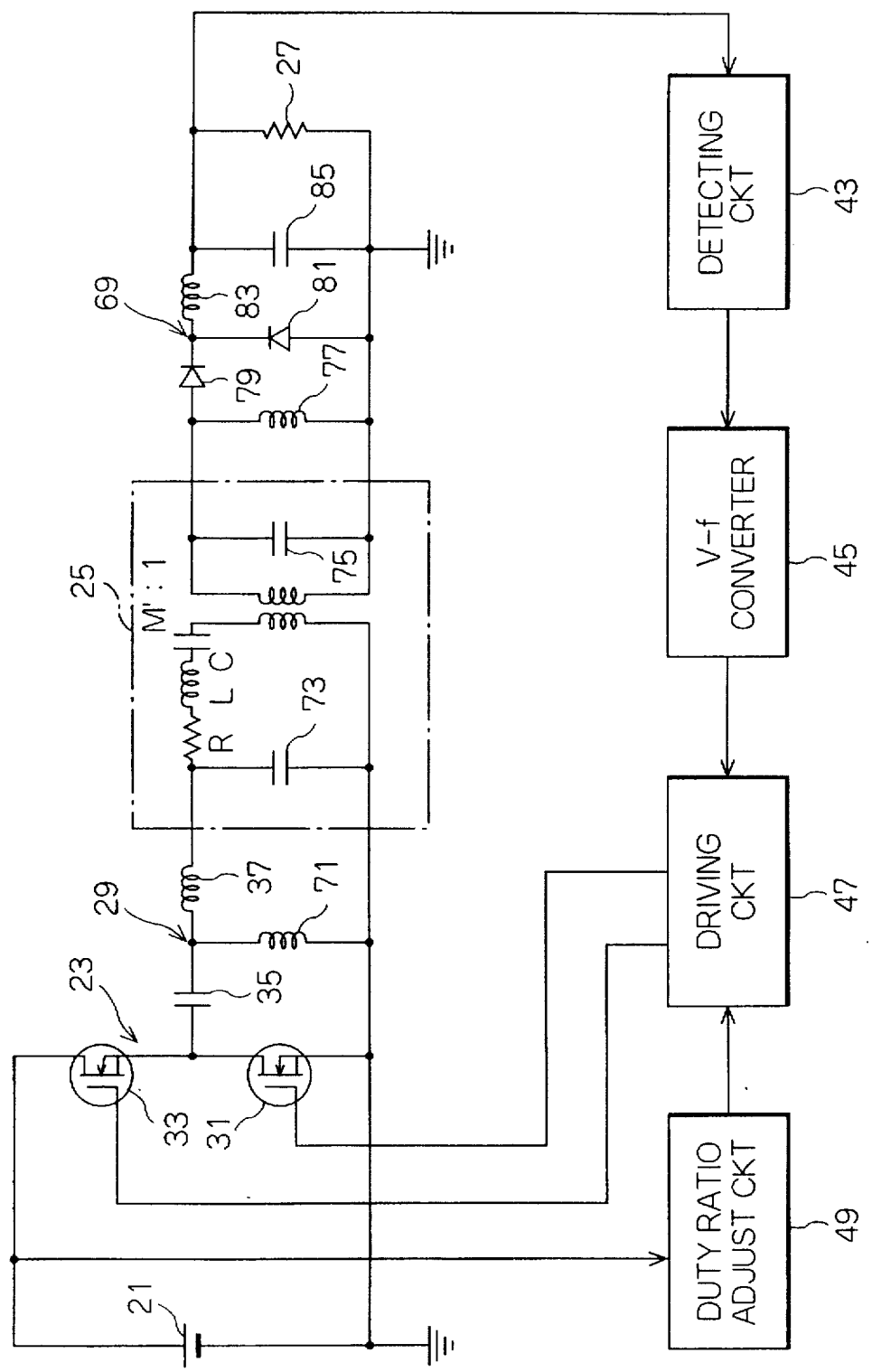
FIG. 11 shows a block diagram, partly as an equivalent circuit, of a converter according to a third embodiment of this invention.
Figure 12:
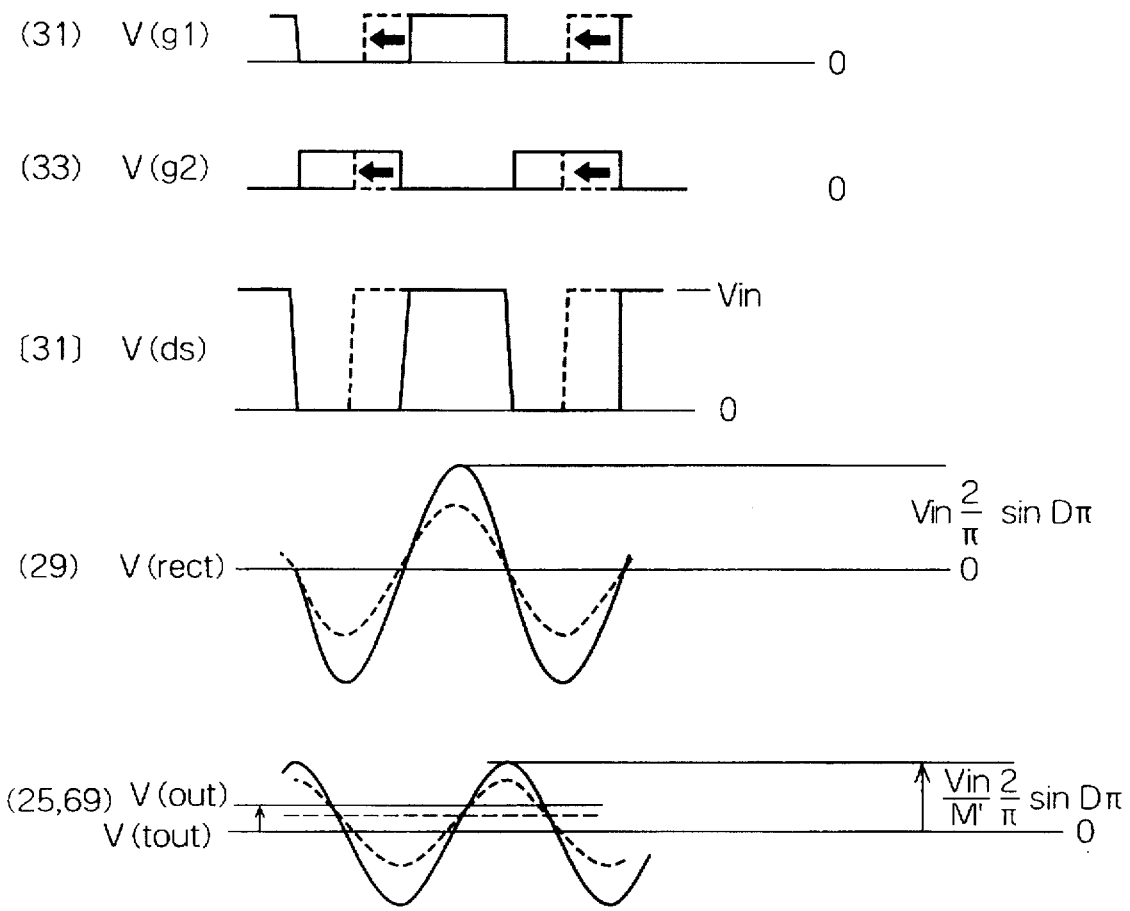
FIG. 12 schematically shows signal waveforms at several points in the converter illustrated in FIG. 11.

Referring now to FIGS. 11 and 12, the description will proceed to a converter according to a third preferred embodiment of this invention. This converter is similar to that described with references to FIGS. 2 through 4 and, except for the feed forward control of the duty ratio D, to those disclosed in the prior patent application referred to hereinabove.

The filtering circuit 29 does not comprise the filtering circuit parallel capacitor 39 described in conjunction with FIG. 2 but comprises instead a soft switching inductor 71 between ground and a point of series connection of the d.c. bias blocking capacitor 35 and the filtering circuit series inductor 37. The piezoelectric transformer 25 is depicted by an equivalent circuit. The input capacitance is present between the input electrode layers and is indicated at 73. In cooperation with the input capacitance 73, the soft switching inductor 71 filters the switched signal V(ds) into the filtered signal V(rect). Between output electrode layers, the piezoelectric transformer 25 has an output capacitance 75. Being an alternating voltage, the transformer input signal charges and discharges the input and the output capacitances 73 and 75 to give rise to a circulation loss and to deteriorate the transformer and the converter efficiencies.

In FIG. 11, the output circuitry 69 is implemented by a half-bridge rectifier which will be designated by the reference numeral 69. The transformer output voltage will be indicated by V(tout). The rectifier 69 comprises a rectifier parallel or resonant inductor 77 supplied with the transformer output voltage, diodes 79 and 81, a rectifier series inductor 83, and a rectifier parallel capacitor 85. The circulation loss is reduced by a rectifier current, which flows through the resonant inductor 77 to charge and discharge the input and the output capacitances 73 and 75 when the transformer output voltage is positive and negative. This keeps the converter efficiency high.

In FIG. 12, the first and the second gate control voltages V(g1) and V(g2) are exemplified along first or top and second rows with the labels (31) and (33). The switched voltage V(ds) is illustrated along a third row with the label [31] and has a peak value of the converter input voltage V(in). The filtered voltage V(rect) is depicted along a fourth row with the label (29) and has a peak value of $(2/\pi)$ V(in)sin D$\pi$. Together with the converter output voltage V(out) supplied across the load 27 and depicted by horizontal solid and dashed lines for the duty ratio of 0.5 and 0.25, the transformer output voltage V(tout) is shown along a fifth or bottom row with a combined label (25, 69). Similar to the rectifier output voltage depicted in FIG. 3, the transformer output voltage is now equal to $(2/\pi)(1/M')V(in)\sin D\pi$, where M' represents a turn ratio M':1 of an elementary transformer in the equivalent circuit.

Figure 13:
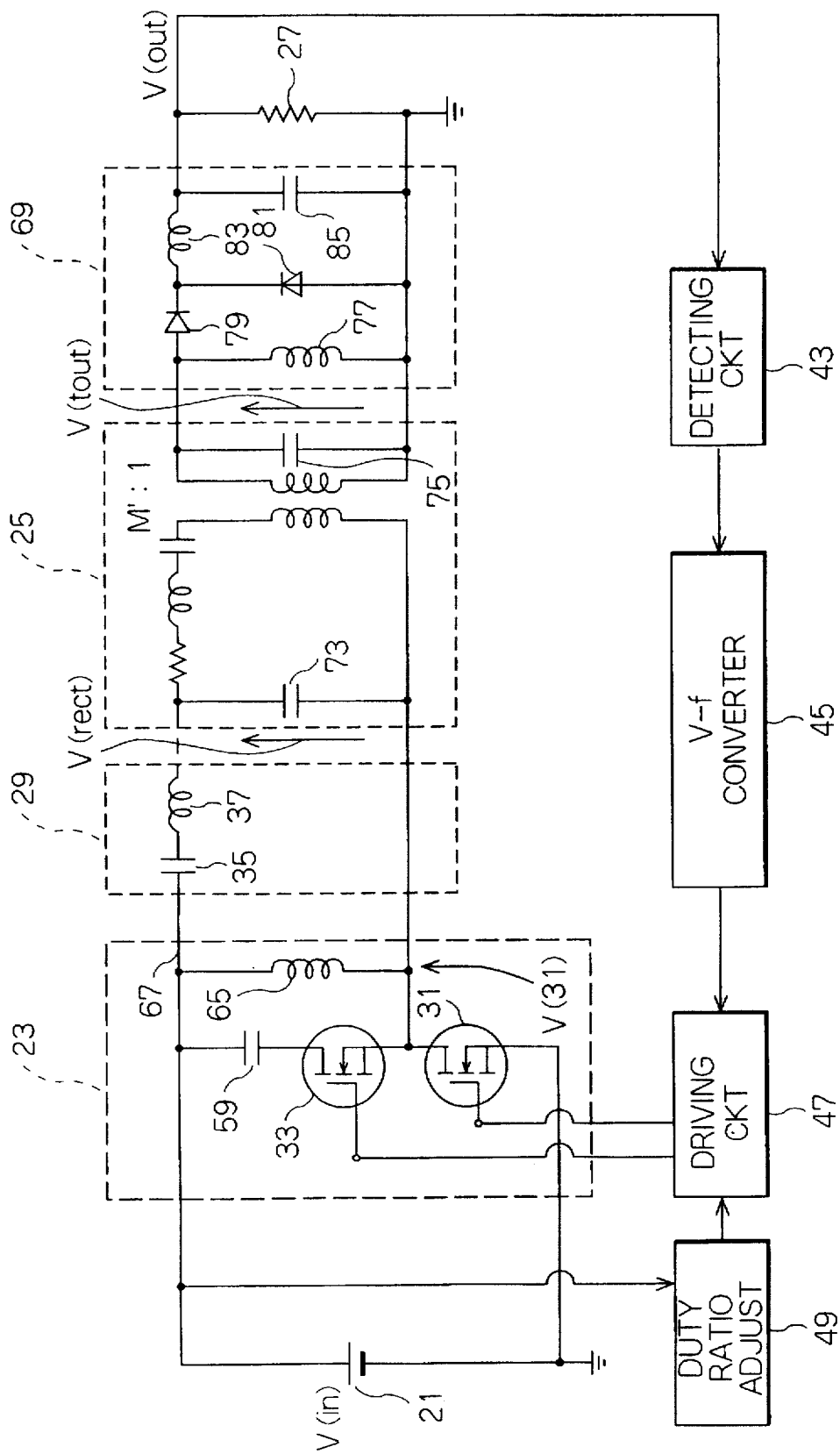
FIG. 13 shows partly as an equivalent circuit a block diagram of a converter according to a fourth embodiment of this invention.
Figure 14:
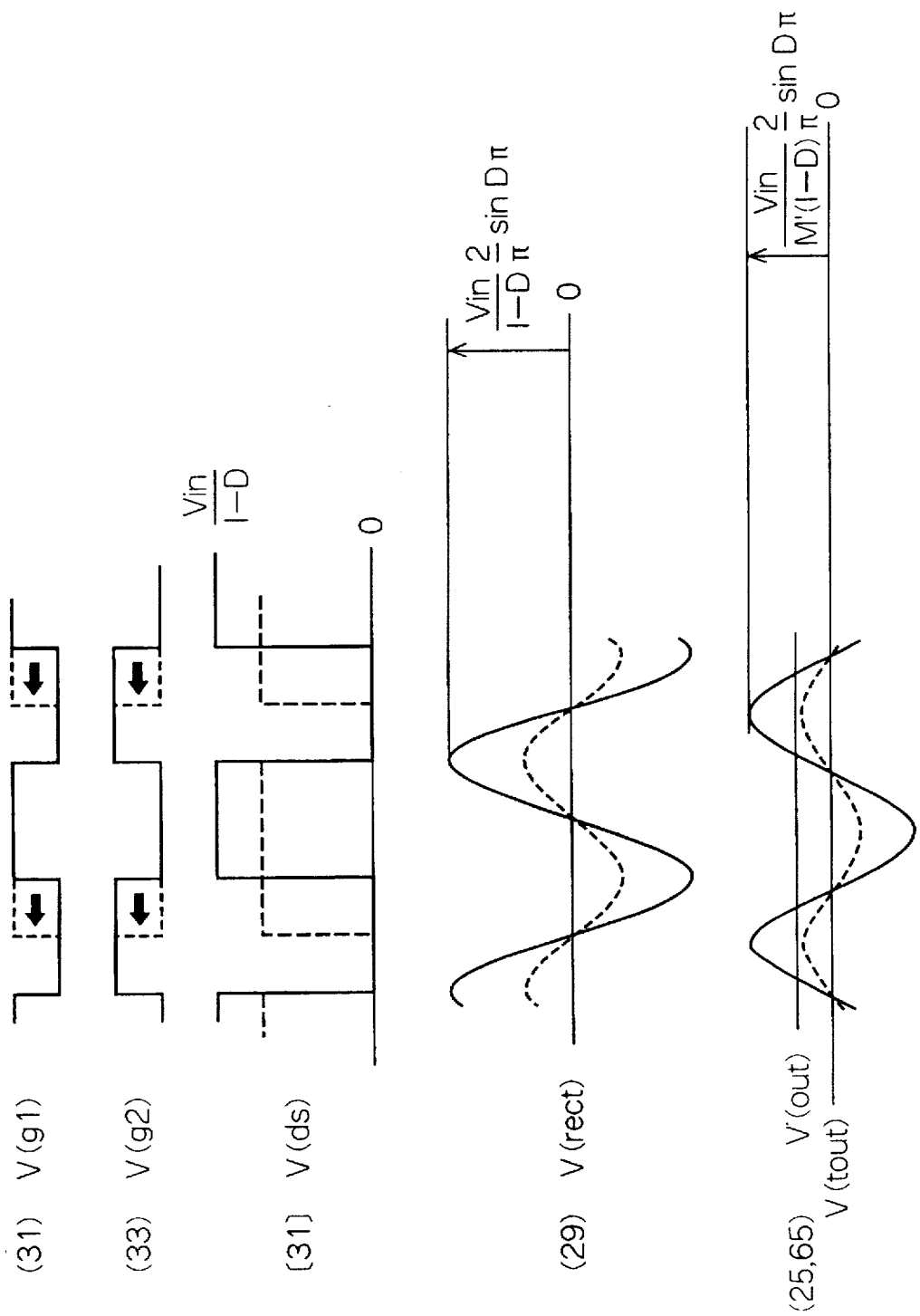
FIG. 14 schematically shows signal waveforms in a converter depicted in FIG. 13.

Turning to FIGS. 13 and 14, attentions will be directed to a converter according to a fourth preferred embodiment of this invention. This converter is similar to that illustrated with reference to FIGS. 11 and 12. An active clamp circuit is used as the switching circuit 23 and is designated by the reference numeral 23. The filtering circuit 29 comprises the d.c. bias blocking capacitor 35 and the filtering circuit series inductor 37. The first and the second gate control voltages V(g1) and V(g2), the switched voltage V(ds), and the filtered signal V(rect) are similar to those described in conjunction with FIG. 8. Like in FIG. 12, the transformer output voltage V(tout) is variable sinusoidally with an amplitude which is equal to $(2/\pi)\ V(in)/\{M'\ (1-D)\}\times \sin D\pi$. In FIG. 4, the transformer input voltage is depicted again by the straight line 61.

In FIGS. 13 and 14, it should be thoughtfully noted that the switched signal V(ds) is given the peak value of V(in)/(1−D) so that its fundamental component has the amplitude A(fund) which is rectilinear in relation to the duty factor D in the manner exemplified in FIG. 4 by the straight line 61. In addition, the filtering circuit 29 and the piezoelectric transformer 25 collectively have an excellent band-pass filter characteristic to make the converter output voltage V(out) constant. The converter of FIG. 13 is consequently well controlled by the duty ratio and copes accordingly with wide variations in the converter input voltage and the load resistance.

What is claimed is:

1. A converter for converting a direct current converter input signal to an alternating current converter output signal for use in driving a load, comprising:

input means responsive to said direct current converter input signal for generating a transformer input signal of a switched frequency and an adjustable duty ratio;

piezoelectric transformer means for transforming said transformer input signal into a transformer output signal;

output means responsive to said transformer output signal for producing said alternating current converter output signal;

detecting means for detecting said alternating current converter output signal to produce a detected voltage signal;

voltage-to-frequency converting means for converting said detected voltage signal to a detected frequency signal;

driving means for driving said input means by a substantially rectangular drive signal to adjust said switched frequency in response to said detected frequency signal from said voltage-to-frequency converting means; and duty ratio adjusting means for controlling said substantially rectangular drive signal to adjust said duty ratio in response to said direct current converter input signal.

2. A converter as claimed in claim 1, wherein:

said input means comprises of a switching circuit for switching said converter input signal by the substantially rectangular drive signal of said adjustable duty ratio into said transformer input signal;

said piezoelectric transformer means comprises a piezoelectric transformer responsive to said transformer input signal for producing said transformer output signal;

said output means comprises f a signal delivering connection for delivering said transformer output signal as said converter output signal.

3. A converter as claimed in claim 2, wherein said duty ratio adjusting means adjusts said duty ratio between 0.5 and 0.25.

4. A converter as claimed in claim 1, wherein:
   said input means comprises:

a switching circuit for switching said converter input signal by the substantially rectangular drive signal of said adjustable duty ratio into a switched signal of said switched frequency; and a filtering circuit for filtering said switched signal into said transformer input signal;

said piezoelectric transformer means comprises a piezoelectric transformer responsive to said transformer input signal for producing said transformer output signal.

5. A converter as claimed in claim 4, wherein said switching means comprises first and second switching elements connected in series and switched alternatingly by the substantially rectangular drive signal of said adjustable duty ratio, said first switching element producing said switched signal when said converter input signal is supplied across a series connection of said first and said second switching elements.

6. A converter as claimed in claim 5, wherein said output means comprises of a signal delivering connection for delivering said transformer output signal as said converter output signal.

7. A converter as claimed in claim 6, wherein said duty ratio adjusting means adjusts said duty ratio between 0.5 and 0.25.

8. A converter as claimed in claim 5, wherein said output means consists of a rectifier circuit for smoothing said transformer output signal into said converter output signal.

9. A converter as claimed in claim 8, wherein said duty ratio adjusting means adjusts said duty ratio between 0.5 and 0.25.

10. A converter as claimed in claim 4, wherein said switching means comprises:

an active clamping circuit inductor;

a first switching element periodically rendered on by said substantially rectangular drive signal to supply said converter input signal to said active clamping circuit inductor for development of a clamping circuit output voltage across said active clamping circuit inductor;

a clamping capacitor;

a second switching element connected in series to said clamping capacitor and to said first switching element and rendered on by said substantially rectangular drive signal with a dead time interposed alternatingly relative to said first switching element to clamp said clamping circuit output voltage while said first switching element is off; and delivering means for delivering said clamping circuit output voltage as said switched signal.

11. A converter as claimed in claim 10, wherein:

said active clamping circuit inductor is a primary winding of a clamping circuit electromagnetic transformer;

said delivering means being a secondary winding of said clamping circuit electromagnetic transformer.

12. A converter as claimed in claim 11, wherein said output means consists of a signal delivering connection for delivering said transformer output signal as said converter output signal.

13. A converter as claimed in claim 12, wherein said duty ratio adjusting means adjusts said duty ratio between 0.5 and 0.25.

14. A converter as claimed in claim 11, wherein said output means comprises of a rectifier circuit for smoothing said transformer output signal into said converter output signal.

15. A converter as claimed in claim 14, wherein said duty ratio adjusting means adjusts said duty ratio between 0.5 and 0.25.

16. A converter as claimed in claim 10, wherein said delivering means is a connection connected to said active clamping circuit inductor.

17. A converter as claimed in claim 16, wherein said output means comprises of a signal delivering connection for delivering said transformer output signal as said converter output signal.

18. A converter as claimed in claim 17, wherein said duty ratio adjusting means adjusts said duty ratio between 0.5 and 0.25.

19. A converter as claimed in claim 16, wherein said output means comprises of a rectifier circuit for smoothing said transformer output signal into said converter output signal.

20. A converter as claimed in claim 19, wherein said duty ratio adjusting means adjusts said duty ratio between 0.5 and 0.25.

21. A converter as claimed in claim 1, wherein:
said input means comprises:
   a switching circuit for switching said converter input signal by the substantially rectangular drive signal of said adjustable duty ratio into a switched signal of said switched frequency; and
   a filtering circuit for filtering said switched signal into said transformer input signal;
said piezoelectric transformer means comprising:
   an electromagnetic transformer responsive to said transformer input signal for producing a voltage raised signal; and
   a piezoelectric transformer responsive to said voltage raised signal for producing said transformer output signal.

22. A converter as claimed in claim 21, wherein said switching means comprises first and second switching elements connected in series and switched alternatingly by the substantially rectangular drive signal of said adjustable duty ratio, said first switching element producing said switched signal when said converter input signal is supplied across a series connection of said first and said second switching elements.

23. A converter as claimed in claim 22, wherein said output means comprises of a signal delivering connection for delivering said transformer output signal as said converter output signal.

24. A converter as claimed in claim 23, wherein said duty ratio adjusting means adjusts said duty ratio between 0.5 and 0.25.

25. A converter as claimed in claim 22, wherein said output means comprises of a rectifier circuit for smoothing said transformer output signal into said converter output signal.

26. A converter as claimed in claim 25, wherein said duty ratio adjusting means adjusts said duty ratio between 0.5 and 0.25.

27. A converter as claimed in claim 21, wherein said switching means comprises:
   an active clamping circuit inductor;
   a first switching element periodically rendered on by said substantially rectangular drive signal to supply said converter input signal to said active clamping circuit inductor for development of a clamping circuit output voltage across said active clamping circuit inductor;
   a clamping capacitor;
   a second switching element connected in series to said clamping capacitor and to said first switching element and rendered on by said substantially rectangular drive signal with a dead time interposed alternatingly relative to said first switching element to clamp said clamping circuit output voltage while said first switching element is off; and
   delivering means for delivering said clamping circuit output voltage as said switched signal.

28. A converter as claimed in claim 27, wherein:
   said active clamping circuit inductor is a primary winding of a clamping circuit electromagnetic transformer;
   said delivering means being a secondary winding of said clamping circuit electromagnetic transformer.

29. A converter as claimed in claim 28, wherein said output means comprises of a signal delivering connection for delivering said transformer output signal as said converter output signal.

30. A converter as claimed in claim 29, wherein said duty ratio adjusting means adjusts said duty ratio between 0.5 and 0.25.

31. A converter as claimed in claim 28, wherein said output means comprises of a rectifier circuit for smoothing said transformer output signal into said converter output signal.

32. A converter as claimed in claim 31, wherein said duty ratio adjusting means adjusts said duty ratio between 0.5 and 0.25.

33. A converter as claimed in claim 28, wherein said delivering means is a connection connected to said active clamping circuit inductor.

34. A converter as claimed in claim 33, wherein said output means comprises of a signal delivering connection for delivering said transformer output signal as said converter output signal.

35. A converter as claimed in claim 34, wherein said duty ratio adjusting means adjusts said duty ratio between 0.5 and 0.25.

36. A converter as claimed in claim 33, wherein said output means comprises of a rectifier circuit for smoothing said transformer output signal into said converter output signal.

37. A converter as claimed in claim 36, wherein said duty ratio adjusting means adjusts said duty ratio between 0.5 and 0.25.

38. A method of converting a direct current input signal into an alternating current output signal for driving a load, comprising the steps of:
   converting a direct current input signal into an alternating current switched signal;
   transforming said alternating current switched signal into an alternating current output signal for driving a load;
   sensing a voltage level or a current level of said alternating current output signal to generate a frequency modulation feedback control signal;
   sensing a duty ratio of said direct current input signal to generate a duty ratio control signal;
   controlling a switching frequency and a duty ratio of said switched signal in response to said frequency modulation feedback control signal and said duty ratio control signal, respectively.

39. The method of claim 38, wherein said transforming step uses a piezoelectric transformer for transforming said switched signal.

40. The method of claim 38, further comprising the step of filtering said switched signal after said converting step.

* * * * *